Patented Nov. 18, 1952

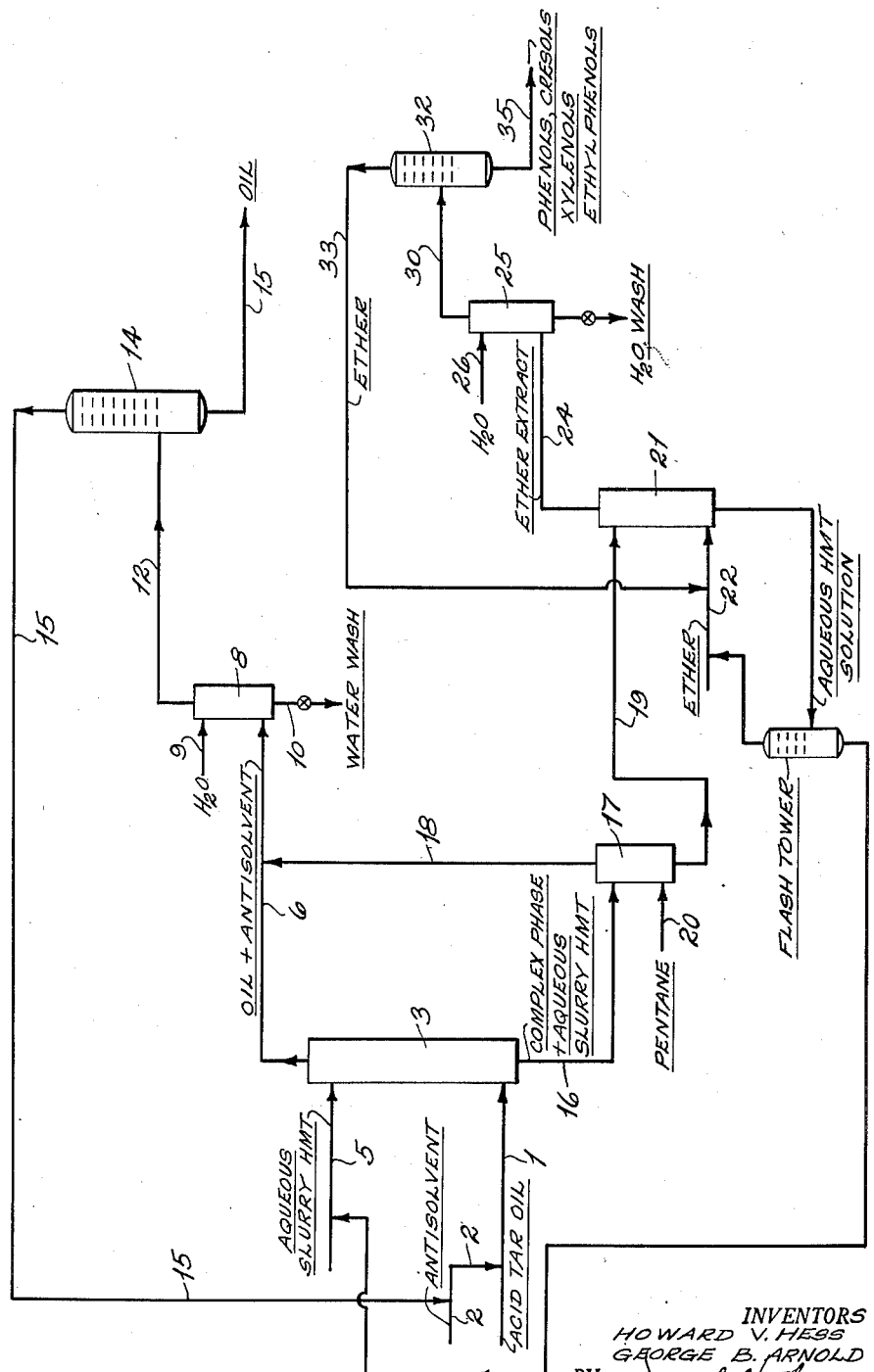

2,618,664

UNITED STATES PATENT OFFICE 2,618,664

PROCESS FOR ISOLATING PHENOLIC COMPOUNDS FROM MIXTURES THEREOF

Howard V. Hess, Beacon, and George B. Arnold, Glenham, N. Y., assignors to The Texas Company, New York, N. Y., a corporation of Delaware Application July 29, 1950, Serial No. 176,661

22 Claims. (Cl. 260—621)

This invention relates to a novel process for isolating phenolic compounds from mixtures thereof. It is particularly concerned with the isolation of phenol, cresols, ethylphenols and xylenols from aromatic mixtures, such as coal tar, which are commercial sources of such compounds.

In accordance with the process of this invention, low molecular weight phenolic compounds, such as phenol, cresols, ethylphenols and xylenols, are separated from crude mixtures wherein they are associated with higher phenolic compounds and non-phenolic compounds by contact with aqueous hexamethylene tetramine in the presence of an anti-solvent. Contact of the phenolic compound-containing mixture with aqueous hexamethylene tetramine in the presence of an anti-solvent results in the formation of complexes of hexamethylene tetramine with phenol, cresols, ethylphenols and xylenols, which are substantially insoluble in the crude mixture and are readily separated therefrom as a liquid complex phase. A paraffinic hydrocarbon or a mixture of paraffinic hydrocarbons is employed as the anti-solvent; a pentane fraction is a particularly preferred anti-solvent. Decomposition of the separated liquid complex phase is effected by contact with an oxygenated hydrocarbon solvent, such as ether, which extracts phenol, cresols, ethylphenols and xylenols from the complex.

Contact of the crude aromatic mixture with aqueous hexamethylene tetramine is ordinarily effected at atmospheric temperature, but the upper allowable temperature limit is approximately 180° F. Decomposition of the complex with an ether solvent is also effected at temperatures below 180° F. The phenol, cresols, ethylphenols and xylenols recovered by ether extraction of the liquid complex are of a high degree of purity and can be used without further treatment in the manufacture of resins. The hexamethylene tetramine recovered by complex decomposition is recycled to contact further quantities of crude aromatic mixture.

Phenols, cresols and xylenols are important chemicals of commerce and are widely used in the manufacture of resins, dyes, pharmaceuticals and petroleum additives. In recent years the synthetic resin industry has been responsible for an ever increasing demand for phenol, cresols and xylenols to be used in phenolic resins. At the present time the largest source of phenol, cresols and xylenols is coal tar from which over 100 million pounds per year of aromatic hydroxy compounds are obtained. Other potential sources of these low molecular weight phenolic compounds are as follows: the tar produced from by-product coke ovens which contains about 2 to 4 per cent tar acids is a potential source of over 100 million pounds per year of phenolic-type compounds; the tar produced in city gas plants is another potential source of 7 million pounds per year of phenolic-type compounds; shale oil also has a considerable content of phenolic compounds; oils produced by coal hydrogenation and low temperature carbonization are additional potential sources of phenolic compounds.

At the present time isolation of phenolic compounds from coal tar and from other sources is effected by extraction with solvents; solutions of caustic soda, of sodium carbonate and of sodium sulfide, aqueous alcohol, formic acid solution, pyridine sulfate solution are examples of solvents employed in recovery of phenolic compounds. All of these extraction processes involve the use of elaborate equipment and most of them are accompanied by a substantial consumption of chemicals. In general, these extraction processes are very unsatisfactory for separating phenol from oils of low phenol content. In addition, solvent extraction processes do not effect good separation of phenols from aromatic oils. Most of the extraction processes have the inherent difficulty that they leave a small amount of aromatic oil in the tar acid concentrate.

The process of this invention provides an effective means for isolating low molecular weight phenolic compounds, namely, phenol itself, cresols, ethylphenols and xylenols from crude mixtures of both high and low phenolic content. In addition, phenol, cresols, ethylphenols and xylenols may be separated from higher molecular weight aromatic hydroxy compounds by the process of this invention. The fact that the phenols, cresols, ethylphenols and xylenols recovered by the complexing technique of this invention may be immediately used in resin manufacture makes this invention of paramount importance in commercial production of phenols.

It is known that hexamethylene tetramine forms solid complexes with aromatic compounds containing one or more hydroxy groups attached to an aryl nucleus. However, when crude mixtures of phenolic compounds are contacted with hexamethylene tetramine, solid complex formation does not occur. Only when an aromatic fraction containing predominantly phenol alone is used does solid complex formation result. Accordingly, despite the specificity of hexamethylene tetramine as a complexing agent for phenolic compounds, it has not been possible, prior to this invention, to take advantage of this complexing action in separating phenolic compounds from crude mixtures containing a variety of phenolic compounds. The process of this invention utilizes the discovery that a phenol-containing mixture contacted with aqueous hexamethylene tetramine is resolved into two liquid phases in the presence of an anti-solvent and provides a commercial process for separating phenol, cresols, ethylphenols and xylenols from crude mixtures, such as coal tar distillates.

In our co-pending application, Serial No. 176,662, filed on July 29, 1950, it is disclosed that phenol, cresols, ethylphenols and xylenols may be separated from crude aromatic mixtures by effecting contact of the aromatic mixture with solid hexamethylene tetramine and effecting separation of the treated aromatic mixture into two liquid phases in the presence of an anti-solvent; the preferred modification involves dilution of the aromatic mixture prior to contact with solid hexamethylene tetramine, although it is feasible to add the anti-solvent to the hexamethylene tetramine-contacted aromatic mixture.

The present invention involves the additional discovery that phenol, cresols, ethylphenols and xylenols can be separated from an aromatic mixture by contact of anti-solvent solution of aromatic mixture with an aqueous solution or slurry of hexamethylene tetramine whereby a liquid complex phase separates from the aromatic mixture. The discovery that contact of diluted aromatic mixture with aqueous hexamethylene tetramine results in the formation of a liquid complex phase is an additional advance in the art of removing low molecular weight phenolic compounds from aromatic mixtures since it permits the utilization of a complete liquid-liquid system. The fact that aqueous hexamethylene tetramine can be employed in place of solid hexamethylene tetramine permits better molecular contact between low molecular weight phenolic compounds and hexamethylene tetramine with the result that a faster and more efficient operation is realized.

An aqueous slurry or solution of hexamethylene tetramine may be employed to contact the anti-solvent solution of aromatic mixtures. It is necessary to employ saturated or near-saturated solutions as the use of dilute hexamethylene tetramine solutions is impractical because the formed complex is decomposed by the extra dissolving power of dilute hexamethylene tetramine solutions. For most operations it is preferred to employ an aqueous slurry because its use entails the handling of much smaller volumes than does the use of hexamethylene tetramine solutions. The use of aqueous slurries of hexamethylene tetramine is particularly recommended with aromatic mixtures which possess tar acid contents of 40 to 60 per cent. Ordinarily the slurry employed contains approximately 2 to 5 volumes of water per volume of suspended solid hexamethylene tetramine.

Contact of anti-solvent solution of crude aromatic mixture with aqueous slurry or solution of hexamethylene tetramine results in the formation of three phases unless contact is effected under conditions wherein a very large volume of saturated solution of hexamethylene tetramine is employed per volume of complex-forming low molecular weight phenolic compounds present in the crude mixture to be treated. The uppermost phase comprises anti-solvent solution of aromatic mixture from which low molecular weight phenols have been substantially removed; the intermediate layer comprises mainly liquid complex; the bottom layer comprises aqueous solution or slurry of hexamethylene tetramine containing dissolved complex. In the exceptional instances wherein a very large excess of hexamethylene tetramine solution per complex-forming content of the crude mixture is employed, there are only formed two phases, the upper phase comprising anti-solvent solution of aromatic mixture from which low molecular weight phenols have been substantially removed, and the lower layer comprising aqueous solution of complex and hexamethylene tetramine. A two-phase system results from contact of aqueous hexamethylene tetramine with anti-solvent solution of phenol-containing mixture when there are employed approximately 10 to 12 volumes of saturated hexamethylene tetramine solution per volume of complex-forming phenols present in the mixture; for example, two phases result when 5 volumes of saturated hexamethylene tetramine solution are contacted with 1 volume of tar oil containing about 50 volume per cent phenols in an equal volume of anti-solvent. Whether a two or three-phase system results from the contact of the aqueous hexamethylene tetramine with anti-solvent solution of aromatic mixture, separation of the complex phase from the treated aromatic mixture is simply effected as a sharp interface exists therebetween.

Only low molecular weight phenolic compounds may be separated from crude aromatic mixtures in accordance with the process of this invention. Phenol itself and phenolic compounds up to and including those homologs containing aliphatic constituents equivalent to two methyl groups are separable from aromatic mixtures by the process of this invention. Accordingly, phenol itself, cresol isomers, xylenol isomers and ethylphenol isomers are separated from aromatic mixtures in accordance with the process of this invention. The recited phenolic compounds are by far the most important commercial phenols. Apparently the presence of an anti-solvent does not effect separation of hexamethylene tetramine complexes of higher molecular weight phenols from the crude mixture.

The process of this invention involving contact of anti-solvent solution of aromatic mixture with aqueous solution or slurry of hexamethylene tetramine and the resulting formation of a liquid complex phase from which low molecular weight phenols may be obtained by extraction with oxygenated solvent is truly a liquid-liquid system wherein there is no solids handling problem whatsoever. This is an outstanding feature of the invention since filtration techniques, centrifugal separators and time-consuming settling operations to effect complex separation and recovery of low molecular weight phenols therefrom are eliminated.

Another outstanding advantage of the invention is that there is substantially no loss of complexing agent since hexamethylene tetramine obtained on decomposition of the complex phase with oxygenated solvent is recycled in aqueous solution to contact further quantities of aromatic mixture.

The complexing agent employed in the process of this invention is hexamethylene tetramine, a well-known and commercially available condensation product of formaldehyde and ammonia. Hexamethylene tetramine is employed medicinally under the name of Urotropin.

The anti-solvent whose presence allows separation of a liquid complex layer from the crude aromatic mixture is a paraffinic hydrocarbon which is advantageously an aliphatic hydrocarbon containing 3 to 10 carbon atoms. When normal gaseous aliphatic hydrocarbons, such as propane and butane, are employed as anti-solvents, it is necessary to employ a pressure system. Pentanes and hexanes are particularly preferred anti-solvents since they are easily recovered from the aromatic mixture. Napthenes such as cyclohexane and cyclopentane are effective anti-solvents. Mixtures of paraffinic hydrocarbons such as straight run naphtha and petrol ether may also be employed as the anti-solvent.

Ordinarily an equal volume of anti-solvent is added to the aromatic mixture. However, the volume ratio of anti-solvent to crude aromatic mixture may vary between 0.5 and 5 depending upon the concentration of phenolic compounds initially present in the aromatic mixture. In general, if the crude aromatic mixture contains a high percentage of phenolic compounds, volume ratios of anti-solvent to crude aromatic mixture in the lower portion of the range of 0.5 to 5 may be employed whereas higher volume ratios are employed when the phenolic content of the tar acid oil is relatively low. For most purposes equal volumes give excellent results.

Decomposition of the complex is ordinarily effected by contact of the combined complex and aqueous phase or of the complex phase alone with an oxygenated solvent such as ether; in the modification of the invention which results in the formation of two phases rather than three separate phases, decomposition of the complex is effected by contact of the aqueous solution or slurry of complex and hexamethylene tetramine with ether. When the combined complex and aqueous phases or aqueous solution of complex and hexamethylene tetramine are subjected to extraction with ether, the complex is decomposed with the liberation of low molecular weight phenols and hexamethylene tetramine; the low molecular weight phenols are dissolved in the ether extract phase whereas the liberated hexamethylene tetramine is taken up in the aqueous phase. Since the liberated components are immediately taken up in the ether extract phase or in the aqueous phase, there is no solids handling problem. Separation is readily effected between the ether extract phase and the aqueous solution. Ether is stripped from the extract phase to yield a pure fraction of low molecular weight phenols; the aqueous phase is recycled to contact further quantities of crude aromatic mixture.

It is also possible to effect recovery of low molecular weight phenols from the complex by subjecting the separated complex phase alone to contact with an ether solvent. When this procedure is followed, the liberated low molecular weight phenols are dissolved in the ether extract phase and the liberated hexamethylene tetramine is precipitated as a solid component. This method of complex decomposition is not a preferred procedure since it results in the formation of a solid component which has to be dissolved or slurried in aqueous solution prior to its re-use for contacting further quantities of crude aromatic mixture.

An indication of the efficiency of the process of this invention is obtained by consideration of the fact that the liquid complex phase formed in the usual three-phase modification of the invention comprises 50 to 80 weight per cent phenolic compounds and usually 60 to 70 weight per cent phenolic content. The high phenolic compound content of the complex phase results from the high combining power of hexamethylene tetramine with phenolic compounds, which is illustrated by the fact that one mol of hexamethylene tetramine combines with three mols of phenol.

Contact of anti-solvent solution of crude aromatic mixture with aqueous hexamethylene tetramine must be effected at a temperature below 180° F. Ordinarily the contact of aromatic mixture and solid hexamethylene tetramine is effected at temperatures between 50 and 120° F.

Formation of the complexes and separation of the liquid complex phase from the aromatic mixture are apparently not affected by pressure changes. Atmospheric pressure is ordinarily employed in the process of the invention, but both sub-atmospheric and super-atmospheric pressures may be employed. Super-atmospheric pressures are usually employed when the anti-solvent is a normally gaseous hydrocarbon, such as propane or butane.

A number of different procedures may be employed to contact the anti-solvent solution with aromatic oil and aqueous hexamethylene tetramine. A preferred procedure involves countercurrent contact of anti-solvent solution of aromatic oil and aqueous hexamethylene tetramine in a tower. This type system is equivalent to a countercurrent extraction system and results in excellent recovery of low molecular weight phenols from the aromatic oil on unitary contact. Batch-wise operation in mixing vessels equipped with agitators may also be employed but does not possess the efficiency of countercurrent tower contacting. A contact time adequate to assure substantially complete complex formation is desired. 10 to 20 minutes of contact time has been found adequate for complex formation and separation from the aromatic oil.

After the complex phase and aqueous slurry of hexamethylene tetramine are separated from the anti-solvent solution of aromatic oil, the combined complex phase and aqueous slurry are advantageously subjected to washing with a solvent such as pentane to remove dissolved aromatic mixture therefrom. The recovery system is simplified if the same paraffin hydrocarbon that is employed as the anti-solvent is also used to wash the combined complex phase and aqueous slurry. If the complex is to be treated separately for recovery of low molecular weight phenols therefrom, it is possible to subject only the complex phase to washing since the major portion of the entrained residual aromatic oil will be found therein. Since ordinarily the combined complex phase and aqueous hexamethylene tetramine are treated with a decomposition solvent, it is the usual procedure to subject the combined phases to pentane washing.

It is also recommended that the ether extract solution containing low molecular weight phenols obtained in the decomposition of the complex be subjected to an aqueous wash prior to removal of the ether by heat stripping. This water washing removes hexamethylene tetramine and prevents resin formation on heat stripping the ether from the phenolic compounds.

It is advisable to water wash the anti-solvent solution of aromatic mixture separated from the liquid complex phase prior to removal of antisolvent therefrom. This water wash serves to remove residual complex and hexamethylene tetramine from the anti-solvent solution and obviates resin formation during recovery of the anti-solvent.

Decomposition of the complex phase may be effected with oxygenated compounds, such as aliphatic ethers and cyclic ethers, and in general with those oxygenated solvents which have a high solvent power for tar acids and a low solvent power for hexamethylene tetramine and for water. In addition, water is a suitable solvent for decomposition of the complex if the tar acids involved in the complex are substantially insoluble in water. Since water decomposes the complex by dissolving the hexamethylene tetramine portion thereof, it is apparent that it may only be employed where the complex phase comprises substantially water-insoluble phenols, such as xylenols and ethylphenols. Particularly preferred solvents are diethyl ether and tetrahydrofurane.

Decomposition of the complex by contact with ether or water is effected at temperatures below 180° F. in order to avoid resin formation. The usual temperatures employed for complex decomposition are in the range of 50 to 120° F. Since there is no advantage to employing higher temperatures for complex decomposition, it is ordinarily effected at atmospheric temperature.

In the accompanying drawing there is diagrammatically outlined a preferred modification of this invention wherein an anti-solvent solution of feed oil is contacted with an aqueous slurry of hexamethylene tetramine in a countercurrent contact tower and the resulting composite of complex phase and aqueous slurry is extracted with ether to decompose the complex and recover low molecular weight phenols.

Tar acid oil obtained from coal tar distillation and containing approximately 50 weight per cent tar acids is mixed in pipe 1 with an equal volume of pentane anti-solvent which is obtained through a pipe 2. The resulting mixture is introduced into the lower portion of a contact tower 3 wherein it is contacted countercurrently with an aqueous slurry of hexamethylene tetramine which is introduced into the upper portion of the tower 3 through a pipe 5.

Countercurrent contact of the anti-solvent solution of tar acid oil and the aqueous slurry of hexamethylene tetramine results in the formation of hexamethylene tetramine complexes of phenol, cresols, xylenols and ethylphenols. The production of the complexes results in the formation of a third phase in addition to the pentane solution of aromatic oil and the aqueous slurry of hexamethylene tetramine; this third phase is intermediate in density between the pentane solution of aromatic oil and the slurry of hexamethylene tetramine and would be the middle layer in a static system.

There is withdrawn from the upper portion of the tower 3 through a pipe 6 anti-solvent solution of aromatic oil whose content of tar acids has been substantially reduced. The pentane solution of aromatic oil is introduced into the wash tower 8 wherein it is subjected to countercurrent contact with water which is introduced therein through a pipe 9. Water washing removes residual hexamethylene tetramine and complex from the pentane solution prior to heat stripping the pentane therefrom and as a consequence prevents resin formation in the stripping tower. Water wash containing extracted hexamethylene tetramine and complex is removed from the wash tower 8 through a pipe 10 to a hexamethylene tetramine recovery system not shown which comprises a reduced pressure stripper.

Water-washed pentane solution of tar acid oil is removed from the wash tower 8 through a pipe 12 and is introduced into a stripping tower 14 wherein pentane is removed from the tar acid oil. Pentane is taken off overhead through a pipe 15 and is recycled therethrough to a pipe 2 to combine with further quantities of tar acid oil to form anti-solvent solution thereof.

There is withdrawn from the bottom of the stripping tower 14 through a pipe 15 tar acid oil from which phenol, cresols, xylenols and ethylphenols have been substantially extracted and whose total tar acid content is approximately 8 per cent. If further removal of low molecular weight phenolic compounds from this tar acid oil is desired, it can be recycled to the contact tower 3. However, the tar acid can not be lowered below approximately 5 percent because the process of this invention does not remove high molecular weight phenols. This tar acid oil containing approximately 8 weight per cent tar acids is an excellent wood preservative. From the bottom portion of the contact tower 3 there is withdrawn a composite mixture of complex phase and aqueous hexamethylene tetramine slurry. This composite mixture leaves the tower 3 through a pipe 16 into a tower 17 wherein it is subjected to countercurrent washing with pentane or other paraffinic hydrocarbon which is introduced to the tower 17 through a pipe 20. Pentane washing removes dissolved tar oil from the composite of complex phase and aqueous slurry. The pentane wash is removed from the upper portion of the tower through a pipe 18 and combines with the anti-solvent solution of treated tar oil flowing through pipe 6.

The pentane-washed composite is removed from the tower 17 through a pipe 19 and is introduced therethrough into a tower 21 wherein it is subjected to extraction with ether. Contact of the composite mixture with ether results in decomposition of the complex whereby the freed low molecular weight phenols are dissolved in ether and the liberated hexamethylene tetramine is dissolved in the aqueous slurry of hexamethylene tetramine. In the diagram, contact of the composite phase with ether is effected countercurrently in the tower 21. Ether is introduced into the lower portion of the tower 21 through a pipe 22.

The ether extract phase containing disolved low molecular weight phenolic compounds is removed from the upper portion of tower 21 through a pipe 24 and is introduced into a wash tower 25 wherein it is subjected to countercurrent washing with water which is introduced into the tower 25 through a pipe 26. Water washing of the ether extract phase results in removal of dissolved hexamethylene tetramine and complex therefrom. The water wash contains approximately 1 to 2 per cent hexamethylene tetramine and is passed to a reduced pressure stripper for recovery of hexamethylene tetramine; the water wash from the ether extract phase is ordinarily combined with the water wash from the anti-solvent solution of oil for recovery of hexamethylene tetramine.

The water-washed ether extract phase is introduced through a pipe 30 into a fractionating tower 32 wherein ether is distilled from the low molecular weight phenols. Ether is taken off overhead from the tower 32 through a pipe 33 and is recycled therethrough to the extraction tower 21.

Low molecular weight phenols of over 99.5 per cent purity are withdrawn from the fractionating tower 32 through a pipe 35. Phenol, cresols, xylenols and ethylphenols are included in this fraction which can be resolved into individual components by fractional distillation.

The following examples illustrate the process of this invention for recovering phenol, cresols, xylenols and ethylphenols from crude aromatic mixtures.

Example I illustrates the use of a preferred modification involving contact of anti-solvent solution of crude aromatic mixture with an aqueous solution of hexamethylene tetramine and extraction of the combined complex and aqueous phases with ether. Example II illustrates operation involving separate treatment of the complex phase with ether for recovery of low molecular weight phenols therefrom. Example III illustrates the formation of a two-phase system by the use of a large volume of saturated aqueous hexamethylene tetramine solution per complex-forming phenol content of the aromatic mixture.

Example I 200 cc. (184 g.) of a tar acid oil distilling between 352 and 400° F. and containing 64.7 weight percent tar acids was diluted with 200 cc. of pentane and then contacted at a residence time of 10 minutes and at a temperature of about 80° F. with 400 cc. of saturated aqueous solution of hexamethylene tetramine in a stirred vessel. As a result of this contact there was formed a three-phase system comprising an oil-rich phase, a complex-rich phase and an aqueous solution of hexamethylene tetramine and complex. The complex-rich phase and the aqueous solution of complex and hexamethylene tetramine were separated from the oil-rich phase, combined and subjected to washing with approximately 150 cc. of pentane. The pentane wash was combined with the oil-rich phase and the composite thereby formed was subjected to water washing. The water-washed composite was stripped free from pentane to yield 83.5 g. of neutral tar oil containing 2.2 per cent tar acids. Analysis of the tar acids left in the oil revealed that they had an average molecular weight of approximately 150 indicating that they were higher molecular weight phenols than xylenol.

The pentane-washed composite of complex-rich phase and aqueous solution of complex and hexamethylene tetramine was subjected to two-stage ether extraction with approximately 675 cc. of ether. The ether extract phase after washing yielded on stripping 105 g. of tar acid concentrate which analyzed better than 99.5 per cent tar acids. The aqueous raffinate obtained on ether extraction may be recycled to contact further quantities of tar acid oil.

Example II 200 cc. (184 g.) of a tar acid oil distilling between 352 and 400 ° F. and containing 64.7 weight per cent tar acids was diluted with 200 cc. of pentane and then contacted at a residence time of 10 minutes and at a temperature of about 80° F. with 400 cc. of saturated aqueous solution of hexamethylene tetramine in a stirred vessel. As a result of this contact there was formed a three-phase system comprising an oil-rich phase, a complex-rich phase and an aqueous solution of hexamethylene tetramine and complex. The complex-rich phase was separated from the oil-rich phase and the aqueous solution was subjected to washing with 125 cc. of pentane. The pentane wash was combined with the oil-rich phase and the composite thereby formed was subjected to water washing. On stripping the pentane from the composite there was obtained 83.5 g. of neutral tar oil containing 2.2 weight per cent tar acids. Analysis of the tar acids left in the oil revealed that they had an average molecular weight of 148, indicating that they were higher molecular weight phenols than xylenol.

The pentane-washed complex-rich phase was subjected to extraction with 375 cc. of ether and the ether extract thereby formed was water washed. The water-washed ether extract yielded 54.5 g. of tar acid concentrate which analyzed better than 99.5 weight per cent tar acids. Ether extraction of the complex-rich phase resulted in precipitation of solid hexamethylene tetramine.

Example III 500 cc. of tar acid oil containing 49.4 weight per cent of tar acids was diluted with 1000 cc. of pentane and the pentane solution thereby formed was subjected to two-stage liquid-liquid extraction with 2500 cc. of saturated aqueous solution of hexamethylene tetramine. As a result of this extraction there was obtained 1300 cc. of pentane solution of an oil-rich phase and 2200 cc. of an aqueous solution of complex and hexamethylene tetramine. The oil-rich phase was subjected to water washing and stripped free from pentane; there was obtained 305 cc. of aromatic oil containing approximately 12.7 per cent tar acids. Analysis of the tar acids left in the oil indicated that they had an average molecular weight of 148, indicating that they were higher molecular weight phenols than xylenol.

The aqueous solution of complex and hexamethylene tetramine was subjected to ether extraction and the ether extract phase thereby obtained was water washed. The ether extract phase was stripped free of ether and there was obtained 195 cc. of tar acid concentrate which analyzed better than 99.5 weight per cent tar acids.

It is apparent from the foregoing examples that excellent recovery of low molecular weight phenols from crude aromatic mixtures is realized by the process of this invention. It will be noticed that it is possible to reduce the tar acid content of tar acid oil from approximately 50 per cent to approximately 5 per cent in once-through operation. Moreover, the residual tar acids in the treated oil are predominantly high molecular weight phenolic compounds which possess a higher molecular weight than xylenol. The high purity of the recovered low molecular weight phenolic componuds is particularly important since it makes phenolic compounds recovered by the process of this invention particularly desirable for resin manufacture.

Although the invention has been described in connection with the separation of low molecular weight phenols from crude aromatic mixtures, it is apparent that the process is equally applicable to the separation of low molecular weight phenols from high molecular weight phenols. Thus, phenol, cresols, xylenols and ethylphenols can be separated from alkyl-substituted phenols whose molecular weight is higher than that of xylenol.

It is also feasible to contact the crude mixture with aqueous hexamethylene tetramine and thereafter add anti-solvent which effects separation of the complex phase. For example, crude tar oil mixture may be contacted with aqueous hexamethylene tetramine with the resulting formation of complexes of hexamethylene tetramine and low molecular weight phenols, which complexes are partially soluble in the aqueous phase but predominantly soluble in the crude tar oil; addition of anti-solvent to the crude tar oil phase will result in the separation of a liquid complex phase which may be treated in the conventional procedure for recovery of low molecular weight phenols therefrom. This procedure is not recommended since poorer contact and less efficient phenol separation are effected therewith.

Obviously, many modifications and variations of the invention as hereinbefore set forth may be made without departing from the spirit and scope thereof, and only such limitations should be imposed as are indicated in the appended claims.

We claim:

1. A process for separating low molecular weight phenolic compounds of the group consisting of phenol, cresols, ethylphenols and xylenols from a phenolic compound-containing mixture, which comprises contacting said mixture with aqueous hexamethylene tetramine at a temperature below 180° F. whereby there are formed complexes of said hexamethylene tetramine and said low molecular weight phenolic compounds, separating a liquid complex phase from said mixture in the presence of an anti-solvent selected from the group consisting of paraffinic and naphthenic hydrocarbons and mixtures thereof, decomposing said separated complex phase by contact with an oxygenated hydrocarbon solvent having a high solvent power for tar acids and a low solvent power for hexamethylene tetramine and water at a temperature below 180° F. whereby said low molecular weight phenols are liberated from said complex.

2. A process according to claim 1 in which contact of the crude mixture with aqueous hexamethylene tetramine and decomposition of complex are effected at a temperature between 50 and 120° F.

3. A process according to claim 1 in which the decomposition of complex is effected with an ether.

4. A process for separating low molecular weight phenolic compounds of the group consisting of phenol, cresols, ethylphenols and xylenols from a phenolic compound-containing mixture, which comprises diluting said mixture with an anti-solvent selected from a group consisting of paraffinic and naphthenic hydrocarbons and mixtures thereof, contacting diluted mixture with aqueous hexamethylene tetramine at a temperature below 180° F. whereby there is formed a liquid complex of said hexamethylene tetramine and said low molecular weight phenols, which complex is substantially insoluble in anti-solvent solution of said mixture, separating said liquid complex from said mixture and decomposing said separated complex phase by contact with an oxygenated hydrocarbon solvent having a high solvent power for tar acids and a low solvent power for hexamethylene tetramine and water at a temperature below 180° F., whereby said low molecular weight phenols are liberated from said complex.

5. A process for isolating low molecular weight phenolic compounds of the group consisting of phenol, cresols, ethylphenols and xylenols from a phenolic compound-containing mixture, which comprises diluting said mixture with an anti-solvent selected from the group consisting of paraffinic and naphthenic hydrocarbons and mixtures thereof, contacting diluted mixture with aqueous hexamethylene tetramine at a temperature below 180° F. whereby there is formed a liquid complex of said hexamethylene tetramine and said low molecular weight phenols, which complex is substantially insoluble in anti-solvent solution of said mixture, separating said liquid complex from said mixture and decomposing said separated complex phase by contact with an oxygenated hydrocarbon solvent having a high solvent power for tar acids and a low solvent power for hexamethylene tetramine and water at a temperature below 180° F., whereby there is formed a solution of said low molecular weight phenols in said oxygenated hydrocarbon solvent, and recovering said low molecular weight phenols from said solution.

6. A process according to claim 5 in which decomposition of complex is effected with an ether.

7. A process according to claim 5 in which the anti-solvent is a paraffinic hydrocarbon containing 3 to 10 carbon atoms.

8. A process according to claim 5 in which contact of anti-solvent solution of crude mixture with aqueous hexamethylene tetramine and decomposition of complex are effected at a temperature between 50 and 120° F.

9. A process for isolating low molecular weight phenolic compounds of the group consisting of phenol, cresols, ethylphenols and xylenols from a phenolic compound-containing mixture, which comprises diluting said mixture with an anti-solvent selected from the group consisting of paraffinic and naphthenic hydrocarbons and mixtures thereof, contacting said diluted mixture with aqueous hexamethylene tetramine at a temperature between 50 and 120° F., whereby there are formed three phases, the upper phase comprising anti-solvent solution of said mixture, the intermediate phase comprising a liquid complex of said hexamethylene tetramine and said low molecular weight phenolic compounds, and the bottom phase comprising aqueous solution of complex and hexamethylene tetramine, separating said complex phase from said mixture and decomposing said separated complex phase by contact with an ether solvent at a temperature between 50 and 120° F. into crystalline hexamethylene tetramine and solution of said low molecular weight phenols, and recovering said low molecular weight phenols from said solution.

10. A process for isolating low molecular weight phenolic compounds of the group consisting of phenol, cresols, ethylphenols and xylenols from a phenolic compound-containing mixture, which comprises diluting said mixture with an anti-solvent selected from the group consisting of paraffinic and naphthenic hydrocarbons and mixtures thereof, contacting said diluted mixture with aqueous hexamethylene tetramine at a temperature between 50 and 120° F., whereby there are formed three phases, the upper phase comprising anti-solvent solution of said mixture, the intermediate phase comprising a liquid complex of said hexamethylene tetramine and said low molecular weight phenolic compounds, and the bottom phase comprising aqueous solution of complex and hexamethylene tetramine, separating said complex phase and said aqueous mixture from said solution, subjecting a composite jecting a composite of said complex phase and aqueous mixture to contact with an ether solvent at a temperature of 50 to 120° F. whereby the complex is decomposed, liberated hexamethylene tetramine goes into the aqueous mixture and liberated low molecular weight phenols are extracted in said solvent, and recovering said phenols from said solvent.

11. A process according to claim 10 in which the anti-solvent is a paraffinic hydrocarbon containing 3 to 10 carbon atoms.

12. A process according to claim 10 in which an aqueous slurry of hexamethlene tetramine is contacted with anti-solvent solution of mixture.

13. A process according to claim 10 in which a saturated solution of hexamethylene tetramine is contacted with the anti-solvent solution of mixture.

14. A process according to claim 10 in which said composite is subjected to washing with anti-solvent prior to extraction with an aliphatic ether.

15. A process according to claim 10 in which aqueous mixture containing liberated hexamethylene tetramine is recycled to contact anti-solvent solution of mixture.

16. A process according to claim 10 in which said ether solution of low molecular weight phenols is subjected to water washing prior to recovery of said phenols therefrom.

17. A process for isolating low molecular weight phenolic compounds of the group consisting of phenol, cresols, ethylphenols and xylenols from a phenolic compound-containing mixture, which comprises diluting said mixture with an anti-solvent selected from a group consisting of paraffinic and naphthenic hydrocarbons and mixtures thereof, contacting said diluted mixture with saturated aqueous solution of hexamethylene tetramine in a volume ratio of about 10 to 12 volumes of saturated solution per volume of said low molecular weight phenols present in said mixture, effecting said contact at a temperature between 50 and 120° F. whereby there is formed a two-phase system, the upper phase comprising anti-solvent solution of mixture and the lower phase comprising aqueous solution of complex and hexamethylene tetramine, subjecting said lower phase to extraction with an ether solvent at a temperature between 50 and 120° F. whereby the complex is decomposed and the low molecular weight phenols are extracted from the aqueous solution in said solvent phase, and recovering said low molecular weight phenols from said solvent phase.

18. A process according to claim 17 in which said lower phase is washed with anti-solvent prior to extraction with ether.

19. A process according to claim 17 in which said solvent phase is subjected to water washing prior to recovery of phenols therefrom.

20. A process according to claim 17 in which diethyl ether is employed as an extraction solvent.

21. A process for freeing a phenolic compound-containing hydrocarbon mixture of low molecular weight phenolic compounds of the group consisting of phenol, cresols, ethylphenols and xylenols which comprises contacting said mixture with aqueous hexamethylene tetramine at a temperature below 180° F. whereby there are formed complexes of said hexamethylene tetramine and said low molecular weight phenolic compounds, separating a liquid complex phase from said mixture in the presence of an antisolvent selected from the group consisting of paraffinic and naphthenic hydrocarbons and mixtures thereof to leave a hydrocarbon-antisolvent solution and removing antisolvent from said solution to yield a hydrocarbon fraction substantially free of said low molecular weight phenolic compounds.

22. A process for separating low molecular weight phenolic compounds of the group consisting of phenol, cresols, ethylphenols and xylenols from a phenolic compound-containing mixture which comprises diluting said mixture with an anti-solvent selected from the group consisting of paraffinic and naphthenic hydrocarbons and mixtures thereof, contacting said diluted mixture with hexamethylene tetramine in an aqueous medium at a temperature below 180° F., said aqueous medium being at least substantially saturated, and in a volume ratio less than 10 volumes of said medium per volume of said low molecular weight phenols present in said mixture, forming three liquid phases as a result of said contact, the upper phase comprising antisolvent solution of said mixture, the intermediate phase consisting mainly of a liquid complex of said hexamethylene tetramine and said low molecular weight phenolic compounds and the bottom phase comprising an aqueous mixture of hexamethylene tetramine containing a minor amount of complex, separating said intermediate complex phase from said mixture and decomposing said separated complex phase by contact at a temperature below 180° F. with a solvent selected from the group consisting of water and an oxygenated hydrocarbon having a high solvent power for tar acids and a low solvent power for hexamethylene tetramine and water, whereby said low molecular weight phenols are liberated from said complex.

HOWARD V. HESS.
GEORGE B. ARNOLD.

REFERENCES CITED

The following references are of record in the file of this patent:

UNITED STATES PATENTS

| Number | Name | Date |
|---|---|---|
| 2,149,322 | Tuttle | Mar. 7, 1939 |
| 2,310,616 | Cislak et al. | Feb. 9, 1943 |
| 2,499,820 | Fetterly | Mar. 7, 1950 |

OTHER REFERENCES

Harvey et al., J. Ind. Eng. Chem., vol. 13, p. 135–41 (1921).